US010936800B2

(12) United States Patent
Watanabe

(10) Patent No.: US 10,936,800 B2
(45) Date of Patent: Mar. 2, 2021

(54) VIRTUAL STICKY GENERATION

(71) Applicant: Kaoru Watanabe, Sunnyvale, CA (US)

(72) Inventor: Kaoru Watanabe, Sunnyvale, CA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/679,897

(22) Filed: Nov. 11, 2019

(65) Prior Publication Data

US 2020/0097530 A1 Mar. 26, 2020

Related U.S. Application Data

(63) Continuation of application No. 15/925,473, filed on Mar. 19, 2018, now Pat. No. 10,474,744, which is a
(Continued)

(51) Int. Cl.
*G06F 17/00* (2019.01)
*G06F 40/169* (2020.01)
(Continued)

(52) U.S. Cl.
CPC .......... *G06F 40/169* (2020.01); *G06F 3/0482* (2013.01); *G06F 3/0485* (2013.01); *G06F 3/04817* (2013.01); *G06F 3/04842* (2013.01); *G06F 3/04845* (2013.01); *G06F 16/345* (2019.01)

(58) Field of Classification Search
CPC .... G06F 40/169; G06F 16/345; G06F 3/0482; G06F 3/04842; G06F 3/04845; G06F 3/0485; G06F 3/04817
See application file for complete search history.

(56) References Cited

U.S. PATENT DOCUMENTS 7,590,936 B1 * 9/2009 Bendig ................. G06F 16/338
715/272
7,634,732 B1 * 12/2009 Blagsvedt ............. G06F 3/0481
707/999.01
(Continued)

OTHER PUBLICATIONS

Churchill et al., "Anchored Conversations: Chatting in the Context of a Document", Proceedings of the SIGCHI Conference on Human Factors in Computing Systems, dated Apr. 1-6, 2000, pp. 454-461.
(Continued)

*Primary Examiner* — Laurie A Ries
(74) *Attorney, Agent, or Firm* — Hickman Becker Bingham Ledesma LLP; Edward A. Becker

(57) ABSTRACT

Digital programmed logic implemented on a computing device programmed to cause the display of an electronic document on a graphical user interface within the computing device. The electronic document displayed includes a plurality of data items of information. The programmed logic is programmed to automatically generate summary data that summarizes at least two data items from the plurality of data items included in the electronic document. The programmed logic is further programmed to generate a virtual sticky and display the virtual sticky on the electronic document. The virtual sticky displays the automatically generated summary data and the display of the virtual sticky is overlaid onto at least a portion of the display of the electronic document.

20 Claims, 7 Drawing Sheets

Related U.S. Application Data continuation of application No. 15/148,199, filed on May 6, 2016, now Pat. No. 9,922,016.

(51) Int. Cl.
*G06F 16/34* (2019.01)
*G06F 3/0481* (2013.01)
*G06F 3/0482* (2013.01)
*G06F 3/0484* (2013.01)
*G06F 3/0485* (2013.01)

(56) References Cited

U.S. PATENT DOCUMENTS

| | | | |
|---|---|---|---|
| 8,196,051 B2 | 6/2012 | Zaner | |
| 8,640,048 B1 | 1/2014 | Parsons | |
| 8,819,617 B1 | 8/2014 | Koenig | |
| 9,268,763 B1* | 2/2016 | Esho | G06F 16/93 |
| 9,310,983 B2 | 4/2016 | Somasundaram | |
| 10,114,810 B2* | 10/2018 | Raleigh | G06F 40/106 |
| 2002/0023110 A1* | 2/2002 | Fortin | G06F 16/9577 |
| | | | 715/205 |
| 2002/0091740 A1 | 7/2002 | Schantz | |
| 2003/0182168 A1 | 9/2003 | Lyons | |
| 2005/0050015 A1 | 3/2005 | Becker | |
| 2005/0091578 A1* | 4/2005 | Madan | G06F 40/169 |
| | | | 715/201 |
| 2005/0223315 A1 | 10/2005 | Shimizu | |
| 2007/0198935 A1* | 8/2007 | Constantine | G06F 3/0485 |
| | | | 715/744 |
| 2007/0300160 A1 | 12/2007 | Ferrel | |
| 2008/0222548 A1 | 9/2008 | Cohen | |
| 2009/0055737 A1* | 2/2009 | Borchardt | G06F 40/169 |
| | | | 715/708 |
| 2009/0063642 A1 | 3/2009 | Lord | |
| 2010/0070881 A1 | 3/2010 | Hanson | |
| 2011/0016375 A1 | 1/2011 | Ramic | |
| 2011/0314402 A1 | 12/2011 | Kikin-Gil | |
| 2012/0323702 A1 | 12/2012 | Puentes | |
| 2015/0220257 A1 | 8/2015 | Moore | |
| 2015/0220800 A1 | 8/2015 | Mahli | |
| 2016/0026356 A1* | 1/2016 | Persaud | G06F 40/18 |
| | | | 715/212 |
| 2016/0188125 A1 | 6/2016 | Kaplan | |
| 2016/0224532 A1* | 8/2016 | Miller | G06F 16/22 |
| 2016/0321404 A1 | 11/2016 | Ginsburg | |
| 2017/0127128 A1* | 5/2017 | Seger | G06F 16/2282 |
| 2017/0132189 A1 | 5/2017 | Horikiri | |
| 2017/0277668 A1* | 9/2017 | Luo | G06F 16/345 |
| 2017/0322918 A1 | 11/2017 | Watanabe | |
| 2018/0203834 A1 | 7/2018 | Watanabe | |
| 2018/0300351 A1 | 10/2018 | Glover | |

OTHER PUBLICATIONS

Watananbe, U.S. Appl. No. 15/148,199, filed May 6, 2016, Notice of Allowance, dated Nov. 3, 2017.

Watanabe, U.S. Appl. No. 15/925,473, filed Mar. 19, 2018, Notice of Allowance, dated Jul. 17, 2019.

Watanabe, U.S. Appl. No. 15/148,199, filed May 6, 2016, Office Action, dated May 15, 2017.

Watanabe, U.S. Appl. No. 15/148,199, filed May 6, 2016, Final Office Action, dated Sep. 1, 2017.

* cited by examiner

FIG. 3A

| Data Item Number | Description | Payment Amount | Account | Type |
|---|---|---|---|---|
| 1 | HSE REC HOBEY | $57.76 | 6400 | Line |
| 2 | SAN PEL WATER | $31.70 | 6400 | Line |
| 3 | SYS CLS BOX PIZZA | $30.54 | 7340 | Line |
| 4 | BIOPLUS CONT. PAPER | $43.10 | 7340 | Line |
| 5 | STRAW PLA UNWRP | $21.84 | 7340 | Line |
| 6 | COVER TOILET | $11.53 | 7340 | Line |
| 7 | TOWEL MULTI | $30.86 | 7340 | Line |
| 8 | CRV | $2.40 | 6400 | Line |

VIRTUAL STICKY GENERATION

RELATED APPLICATION DATA AND CLAIM OF PRIORITY

This application is a Continuation of prior U.S. patent application Ser. No. 15/925,473 entitled "Virtual Sticky Generation", filed Mar. 19, 2018, which is a Continuation of prior U.S. patent application Ser. No. 15/148,199 entitled "Virtual Sticky Generation", filed May 6, 2016, the contents of all of which are incorporated by reference for all purposes as if fully set forth herein.

FIELD OF THE INVENTION

Embodiments relate generally generating a digital summary of data items within an electronic document on computing devices. SUGGESTED GROUP ART UNIT: 2184; SUGGESTED CLASSIFICATION: 710.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users of data processing systems that receive data reports from multiple external sources may rely on sending and receiving reporting information using electronic documents such as PDF files. Received data reports may then be parsed for relevant information in the reports and then uploaded into the appropriate data processing or data management system. Validity and accuracy of the relevant information parsed is essential for accurate management of data within a data management system. Therefore there is a need verify the accuracy of the data parsed from the electronic documents.

Verification may include comparing information within the electronic document to information that has been identified and parsed by the data processing system. Various systems and approaches may be used to automate the verification process such as designing a data processing system to include error checks of scanned documents. The error checking mechanism may include rescanning the documents and comparing the identified information to the identified information from the first scan. However, automated double checking may be problematic if the second identification process fails to identify errors in information identified by the first process.

Alternatively, users may employ a manual sanity check where a user double checks the identified information against the information displayed on the electronic document itself. However, manual error checks can be a slow and cumbersome process especially when there is a large amount of data to be processed and stored.

SUMMARY

An apparatus includes one or more processors, one or more memories communicatively coupled to the one or more processors and programmed logic executing on the apparatus. Programmed logic may represent application instructions programmed to be performed by the apparatus or logic implemented in field programmable gate arrays or application-specific integrated circuits within the apparatus. The programmed logic is configured to cause the display of an electronic document on a graphical user interface of the apparatus. The electronic document contains data items. The programmed logic is configured to automatically generate summary data of the data items in the electronic document. The programmed logic is configured to generate and display on the electronic document, a virtual sticky that displays the automatically generated summary data. The display of the virtual sticky is overlaid onto at least a portion of the display of the electronic document within the graphic user interface of the apparatus.

BRIEF DESCRIPTION OF THE DRAWINGS

In the figures of the accompanying drawings like reference numerals refer to similar elements.

FIG. 3A depicts an example of a graphical display within the computing device displaying the electronic document.

DETAILED DESCRIPTION

In the following description, for the purposes of explanation, numerous specific details are set forth in order to provide a thorough understanding of the embodiments. It will be apparent, however, to one skilled in the art that the embodiments may be practiced without these specific details. In other instances, well-known structures and devices are shown in block diagram form in order to avoid unnecessarily obscuring the embodiments.

1. OVERVIEW
2. STRUCTURAL OVERVIEW
3. FUNCTIONAL OVERVIEW
4. VIRTUAL STICKY
   4.1. VIRTUAL STICKY DISPLAY OPTIONS
   4.2. VIRTUAL STICKY SUMMARY DATA
5. IMPLEMENTATION MECHANISMS

1. Overview

Digital programmed logic implemented on a computing device is programmed to cause the display of an electronic document on a graphical user interface within the computing device. The electronic document displayed includes a plurality of data items of information. The programmed logic is programmed to automatically generate summary data that summarizes at least two data items from the plurality of data items included in the electronic document. The programmed logic is further programmed to generate a virtual sticky and display the virtual sticky on the electronic document. The virtual sticky displays the automatically-generated summary data and the display of the virtual sticky is overlaid onto at least a portion of the display of the electronic document.

2. Structural Overview

Figure 1:
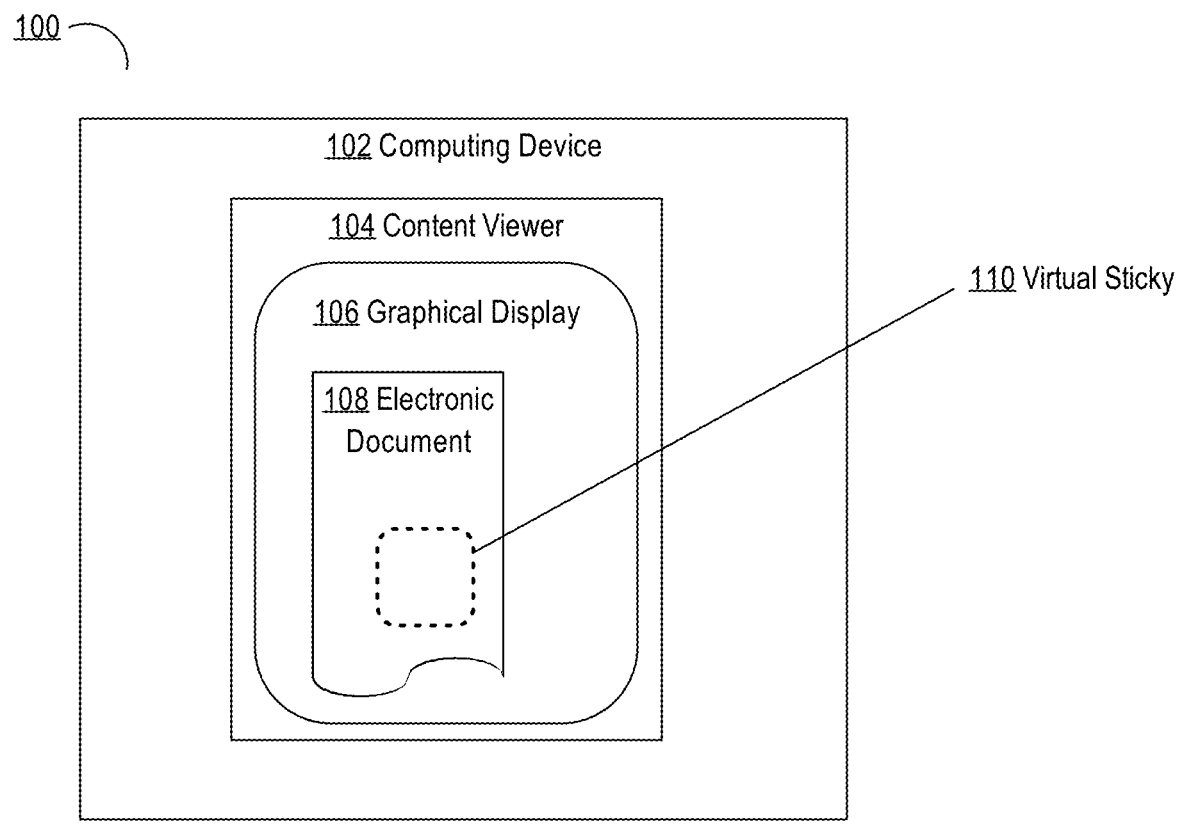
FIG. 1 is a block diagram that depicts an arrangement for displaying an electronic document with a virtual sticky overlaying the electronic document.

FIG. 1 is a block diagram that depicts an arrangement 100 for displaying an electronic document with a virtual sticky overlaying the electronic document. Arrangement 100 includes a computing device 102, a content viewer 104, a graphical display 106, an electronic document 108, and a virtual sticky 110. The computing device 102 may represent various types of computer systems including, but not limited to, a standalone computer system, a mobile computer or laptop, a tablet, or a smartphone. The computing device 102 may be communicatively coupled to one or more computing devices and/or network elements via one or more networks including, for example one or more wired or wireless networks, such as local area networks (LANs), wide area networks (WANs), the Internet, as well as one or more direct connections.

The content viewer 104 may represent one or more computer applications configured or programmed to display, on the graphical display 106, the electronic document 108. In an embodiment, the content viewer 104 is implemented using one or more computer applications or other software elements that are loaded into and executed using the computing device 102, digitally programmed logic implemented in field programmable gate arrays (FPGAs) or application-specific integrated circuits (ASICs).

The graphical display 106 is a display element configured or programmed to graphically display data to a user. Embodiments of the graphical display 106 include, but are not limited to, an LCD or LED computer screen housed within the computing device 102, an external display element communicatively coupled to the computing device, or any other display element implementing commercially available display hardware configured to graphically display data.

The electronic document 108 represents a data file that includes data items stored electronically. Examples of the electronic document 108 includes, but is not limited to, PDFs files, spreadsheet files, text files, or any other data file that includes objects that contain data. An example of data items within the electronic document 108 is a PDF file of an employee timesheet where the employee's time entries are the data items.

The virtual sticky 110 is a digital sticky note designed to display a summary of data items contained in the electronic document 108. For example if the electronic document 108 is an itemized list of expenses based upon the type of expense, then the virtual sticky 110 may display a summary of the itemized expenses by expense type. In an embodiment, the content viewer 104 may include digital computer instructions configured to generate the virtual sticky 110. In other embodiment, digital computer instructions configured to generate the virtual sticky 110 may be implemented by another application separate from the content viewer 104. In an embodiment, the virtual sticky 110 is generated and displayed in a manner such that the virtual sticky 110 is overlaid onto at least a portion of the display of the electronic document 108. Embodiments of the virtual sticky 110 include, but are not limited to, a generated virtual sticky 110 whose display is configurable based upon one or more of size, color, transparency, shape, position of the overlaid display onto the electronic document 108, and duration of persistence of the overlaid display of the virtual sticky 110.

3. Functional Overview

Figure 2:
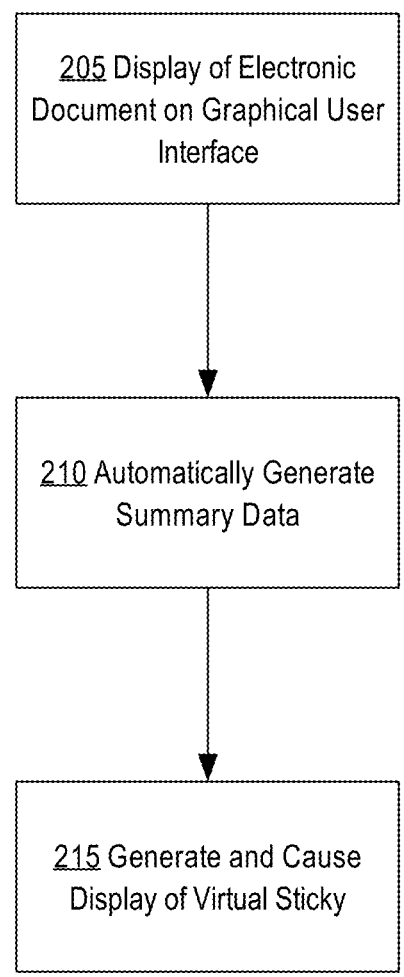
FIG. 2 is a flow diagram that depicts an example method for generating and displaying a virtual sticky that contains summary information of data items within an electronic document.

FIG. 2 is a flow diagram that depicts an example method for generating and displaying a virtual sticky that contains summary information of data items within an electronic document. The steps detailed in FIG. 2 represent steps implemented on the computing device 102.

At step 205, the content viewer 104 displays a graphical representation of the electronic document 108. In an embodiment, the content viewer 104 causes a digital display of the electronic document 108 on the graphical display 106. In an embodiment, the content viewer 104 may receive a request to display the electronic document 108 on the graphical display 106. For example, a user interacting with the content viewer 104 may download the electronic document 108 to the content viewer 104, which then causes the content viewer 104 to display the electronic document 108. In another example, the content viewer 104 may implement a message queue configured to receive electronic documents. The electronic document 108 may be received in the message queue on the content viewer 104. In response to receiving the electronic document 108 in the message queue, the content viewer 104 may be configured to display the received electronic document 108. In an embodiment, the electronic document 108 may be retrieved from an external storage location such as a cloud storage server. In this case, the content viewer 104 may be configured to communicate and retrieve, from the cloud storage server, one or more electronic documents for display.

In an embodiment, the electronic document 108 may contain data items that convey different types of information. For example, if the electronic document 108 is a project management report that contains details of employee tasks and hours spent by each employee on their specific tasks, then the data items may represent text or records that are related employees, tasks, and the hours related to the tasks. In another example, the electronic document 108 may represent a records of items purchased for particular accounts related to a customer. In this example, the data items may represent text or records related to items purchased, customer accounts numbers, purchase price, amount purchased, and any other relevant information related to purchases.

FIG. 3A depicts an example embodiment of the graphical display 106 displaying the electronic document 108 that represents a purchase order of materials. Data items 305 represent the data items within the electronic document 108. In an embodiment, the content viewer 104 may implement optical character recognition (OCR) functions to identify data items 305 within the electronic document 108. The data items 305 identified may include text data and may be in a wide variety of formats, for example, basic or rich text formats or formats supported by application programs and word processing applications. The OCR functions may include a wide variety of functions that may vary depending upon a particular implementation and embodiments are not limited to any particular OCR functions or OCR implementation. For example, a matrix matching algorithm may be used to compare pixels in the electronic document 108 with pixels of letters in various fonts stored in the content viewer 104. Alternatively or additionally, a feature extraction algorithm may be used to compare features in the electronic document 108 with features of characters in various fonts stored in the content viewer 104.

In an embodiment, the content viewer 104 may be configured to display, within the graphical display 106, the identified data items 305. Referring to FIG. 3A table 325 represents the data items 305 identified from the electronic document 108. By displaying the identified data items 305, within the table 325, a user is able to verify and/or reconcile any errors that may have occurred during the data item identification process. For example, the first line item in table 325 has the description of "HSE REC HOBEY" and an amount identified as $57.76. If however, the electronic document 108 displayed in the graphical display 106 actually shows a different amount than $57.76, then the user may be able to manually update the "HSE REC HOBEY" amount value to the correct amount.

Referring back to FIG. 2, at step 210 summary data is automatically generated for at least two data items within the data items 305 identified in the electronic document 108. In an embodiment, summary data represents a summary of information contained in at least two data items within the data items 305. Referring to FIG. 3A data items 1-8 from table 325 may be summarized into summary data based upon a common attribute such as account. For instance, data item numbers 1, 2, and 8 may be summarized based upon the common account number 6400 and data item numbers 3-7 may be summarized based upon their common account number 7340.

In an embodiment, data summarized in the summary data may be based upon one or more content categories. A content category may represent one or more types of attributes within the data items 305. For example, if a data item includes attributes: Description, Payment Amount, Account, and Type. Summary data may then be based on an attribute such as Account such that the summary data includes a mathematical summation of the values for matching accounts. For example, data item numbers 1, 2, and 8 contains Payment Amount values of $57.76, $31.70, and $2.40 respectively. The summary data for data item numbers 1, 2, and 8 may then include a summation of the Payment Amount attribute as $91.86. Other types of summary data may be based on generating a summary of textual attributes where specific words or symbols are identified within an attribute and are then summarized by displaying summary text that conveys specific summary information for the data items. For example, if the data items to be summarized together each contain specific words describing food items purchased, then the summary data may contain specific summary text such as "Food Items" to convey that the data items summarized are all food items. In an embodiment, summary data may incorporate data retrieved from an external data server. For example, descriptive words in data items 305 may be used to query and retrieve information from an external data server. Information retrieved from the external data server may then be used as descriptive summary text within the summary data.

In an embodiment, content categories used to summarize data items may be configurable based upon the type of electronic documents received and the type of the data items within the electronic documents. For instance, different content categories may be implemented for electronic documents related to product invoices than for electronic documents related to work productivity reports. Additionally, content categories may be customized based upon the attributes within the data items. For example, if the electronic document 108 is a work productivity report for multiple employees on a particular project, then specific content categories may be created including, but not limited to: summary data of an employee's total work hours, summary data of an employee's average daily work hours, and summary data of an employee's productivity based on hours worked. In yet another embodiment, content categories may be customized based on the type of external server configured to receive the data items when exported by the content viewer 104. For example, if a project management server has been configured to receive data items related to employment task tracking, then the content categories may be customized to include information specific to tracking employee tasks.

In an embodiment, summary data generated from two or more data items may be automatically updated in response to an update of attribute values within the data items. Users may be required to correct values of data items that may have been incorrectly identified when OCR functions were performed by the content viewer 104. If summary data generated included a summary value for Payment Amount and then a user of the content viewer 104 manually updates the Payment Amount of a particular data item included in the summary data, then the summary data would be automatically be recalculated to reflect the user's update. For example, referring to FIG. 3A the user may manually update the Payment Amount value of data item number 1 in table 325 from $57.76 to $27.76. In response to making the update, the summary data for data item numbers 1, 2, and 8 may automatically recalculate the summary value for the Payment Amount from $91.86 to $61.86.

Figure 3B:
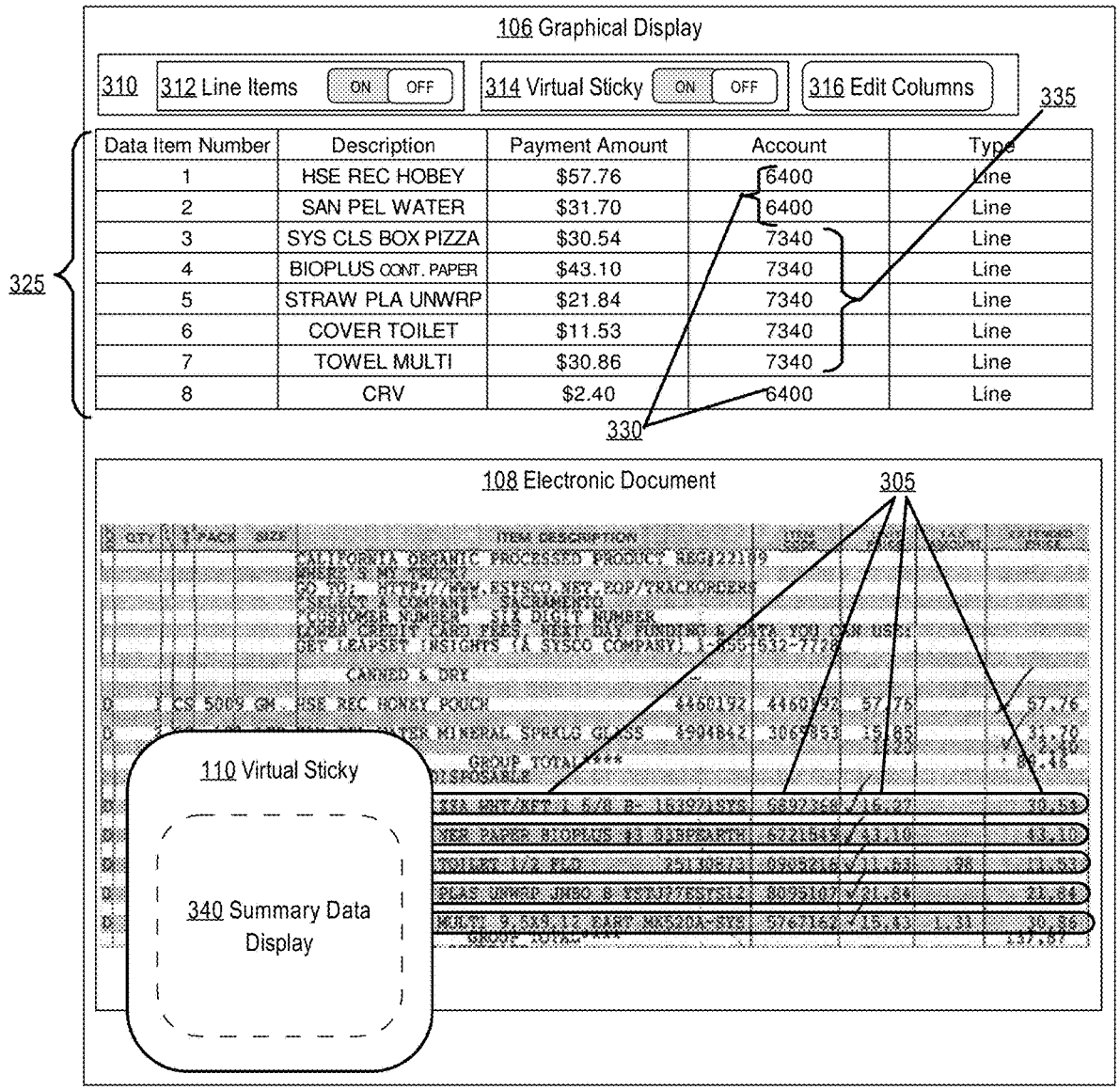
FIG. 3B depicts an example of the graphical display within the computing device displaying the electronic document and a virtual sticky overlaid onto the display of the electronic document.

Referring back to FIG. 2, at step 215 virtual sticky 110 is generated that contains the summary data generated from the data items 305. The virtual sticky 110 is then displayed on the graphical display 106 of the content viewer 104. In an embodiment, the virtual sticky 110 is overlaid onto the display area of the electronic document 108. FIG. 3B depicts an example embodiment of displaying the virtual sticky 110 in an area of the graphical display 106 such that that virtual sticky 110 is overlaid on top of the display of the electronic document 108. In an embodiment, the display of the overlaid virtual sticky 110 may be configured to display on each page of the electronic document 108 if the electronic document 108 is a multi-page document. For example, if the electronic document 108 is a 10 page document, then when the user scrolls to display pages 2-10 of the electronic document 108, the virtual sticky 110 is displayed at the same overlay position for each page of the electronic document 108 displayed within the graphical display 106.

In an embodiment, size, shape, color, and position of the virtual sticky 110 are configurable by the user. In an embodiment, the user may be able to configure the level of transparency of the virtual sticky 110 such that the portion of the electronic document 108, upon which the virtual sticky 110 has been overlaid, may also be visible. Further details related to the position and display of the virtual sticky 110 is discussed in the VIRTUAL STICKY DISPLAY OPTIONS section herein.

In FIG. 3B the virtual sticky 110 includes summary data display 340. Summary data display 340 represents the generated summary data from step 210. In an embodiment, summary data display 340 may represent at least one summary item of the summary data generated at step 210. Summary data display 340 may be configured to display the summary data of the data items 305 in any format, including a table format with configurable rows and columns that include different attributes of the summary data. In an embodiment, the summary data display 340 may be updated automatically when data items 305 are updated within the content viewer 104. For example, if the user manually updates values of data items displayed in the table 325, then the content viewer 104 may trigger an update event that causes the summary data within the summary data display 340 to be updated to reflect the latest calculated values of the summary data. Details related to handling and displaying summary data within the summary data display 340 are discussed in the VIRTUAL STICKY SUMMARY DATA section herein.

4. Virtual Sticky

The virtual sticky 110 is a virtual sticky note configured to display summary information for data items 305 identified within the electronic document 108. In an embodiment, the content viewer 104 may include digital computer instructions configured to generate and display the virtual sticky 110 within the graphical display 106. In another embodiment, the digital computer instructions configured to generate and display the virtual sticky 110 may be implemented by another application or module. Other applications or modules may include, but are not limited to, a separate standalone application, a plugin application or module designed to be triggered by the content viewer 104, or add-on modules that include digital computer instructions for generating and displaying the virtual sticky 110 but are implemented within the content viewer 104 application instance.

4.1. Virtual Sticky Display Options

Figure 4:
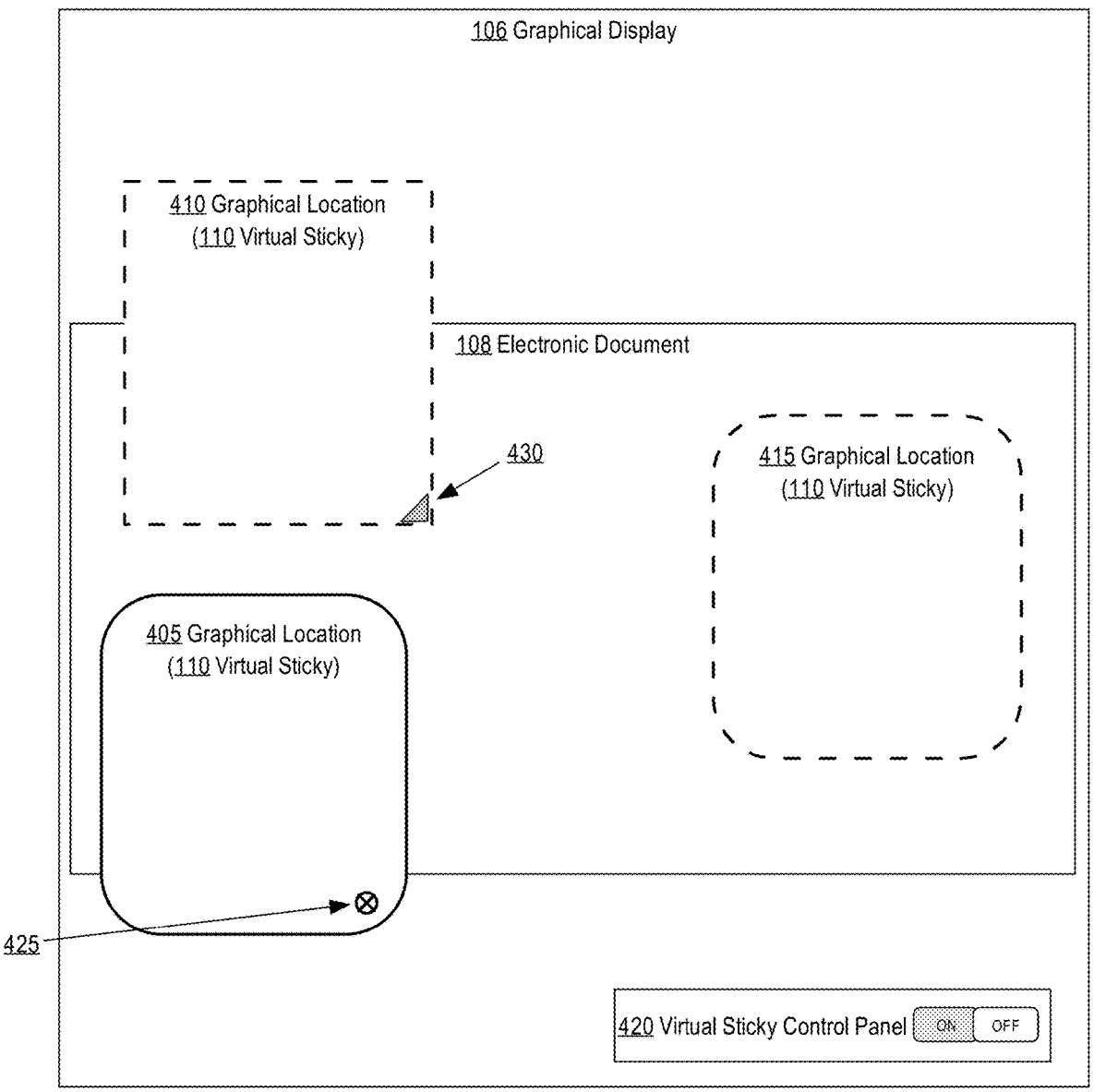
FIG. 4 depicts an example of the graphical display within the computing device displaying the electronic document and the virtual sticky in different positions on the electronic document.

In an embodiment, the virtual sticky 110 is displayed, within the graphical display 106, at a position such that the virtual sticky 110 is overlaid onto at least a portion of the display of the electronic document 108. FIG. 4 depicts an example embodiment of the graphical display 106 displaying the electronic document 108 and the virtual sticky 110 overlaid onto a portion of the electronic document 108. Graphical location 405 depicts a first location where the virtual sticky 110 may be displayed over the electronic document 108. In an embodiment, a portion of the virtual sticky 110 may be overlaid onto the electronic document 108. As depicted in FIG. 4, graphical location 405 depicts an embodiment of the virtual sticky 110 where the top portion of the virtual sticky 110 overlays the display of the electronic document 108. Graphical location 410 depicts an embodiment of the virtual sticky 110 where the bottom portion of the virtual sticky 110 overlays the display of the electronic document 108. Graphical location 415 depicts another embodiment of the virtual sticky 110 where the entire virtual sticky 110 is overlaid onto the display of the electronic document 108.

In an embodiment, the user may configure the position of the virtual sticky 110 by selecting the virtual sticky 110 and dragging the virtual sticky 110 to a different position within the display of the electronic document 108. In another embodiment, position of the virtual sticky 110 may be customized using virtual sticky 110 display options. For example, the graphical display 106 may display a virtual sticky control panel, which may include configuration options to change the positional display of the virtual sticky 110. FIG. 4 depicts an embodiment of a virtual sticky control panel 420 where the user may customize the virtual sticky 110 within the graphical display 106. For example, the user may interact with the virtual sticky control panel 420 to input virtual sticky position coordinates. Upon changing the position coordinates of the virtual sticky 110, the virtual sticky 110 is automatically displayed at the position corresponding to the coordinates entered into the virtual sticky control panel 420. In another embodiment, the virtual sticky control panel may be accessed from the virtual sticky 110 itself using a virtual sticky control panel icon. For example in FIG. 4, virtual sticky control panel icon 425 represents a display options icon that, when selected, allows the user to modify display options for the virtual sticky 110 including the graphical location of the virtual sticky 110.

Figure 5:
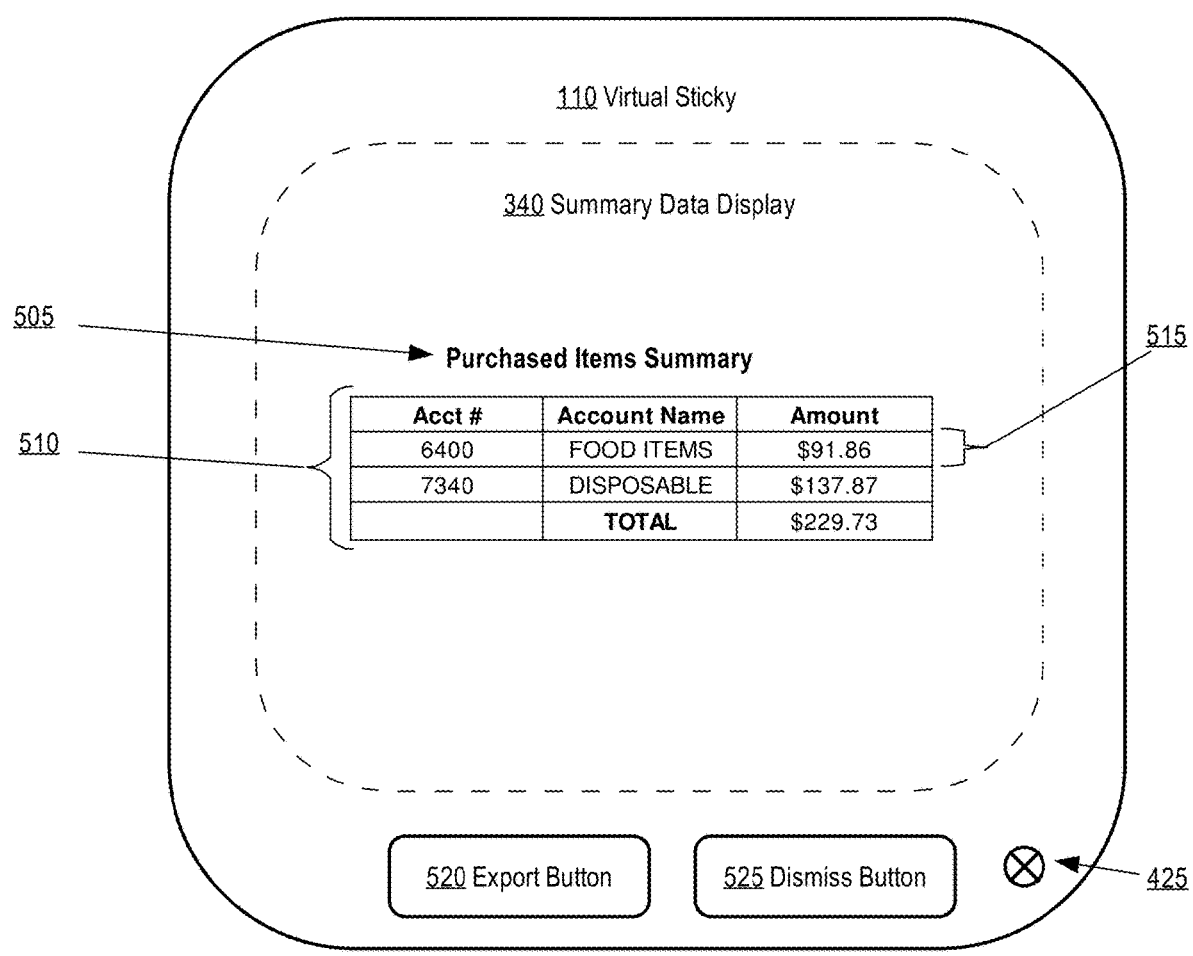
FIG. 5 depicts an example embodiment of the virtual sticky and summary data of the data items from the electronic document within the graphical display.

In an embodiment, the virtual sticky 110 may be configured to display at a default graphical location within the graphical display 106. The default graphical location may be used to determine the location for a virtual sticky that has not been previously configured by the user. In an embodiment, the default graphical location may be configured to determine a position that, when overlaid onto the electronic document 108, does not obstruct the display of data items 305 identified within the electronic document 108. If the default graphical location is unable to determine a position that does not obstruct data items 305, then the default graphical location may be configured to display the virtual sticky 110 at a graphical location that minimizes the number of data items 305 that are obstructed by the display of the virtual sticky 110. In an embodiment, the virtual sticky control panel 420 may be used to enable default display of the virtual sticky 110, such that the virtual sticky 110, if exists, is always displayed onto the electronic document 108. Alternatively, the virtual sticky control panel 420 may be used to disable display of the virtual sticky 110, such that the virtual sticky 110 is not displayed onto the electronic document 108. In this scenario, the user may enable the display of the virtual sticky 110 by pressing or selecting enable options on the virtual sticky control panel 420. In another embodiment the virtual sticky 110 may include controls to disable display of the virtual sticky 110. FIG. 5 depicts a sample embodiment of the virtual sticky 110 and the summary data display 340 displayed within the graphical display 106. The virtual sticky 110 includes a graphical interface control, dismiss control button 525, programmed to disable the display of the virtual sticky 110. Upon being pressed by the user, the virtual sticky 110 would not be displayed on the electronic document 108. In an embodiment, the virtual sticky control panel 420, from FIG. 4 may include graphical interface controls that allow the user to toggle the display of the virtual sticky 110.

In an embodiment, display of the virtual sticky 110 may be configured to persist beyond a single viewing session of the electronic document 108. For example, the virtual sticky 110 may persist within the content viewer 104 such that every time the user views the specific electronic document 108, the corresponding virtual sticky 110 is enabled and overlaid onto the display of the electronic document 108. In an embodiment, level of the persistence of the virtual sticky 110 is configurable. A user may configure the level of persistence such that the virtual sticky is displayed onto the electronic document 108 for a specific period of time after being created. For example, the virtual sticky 110 may be configured to display onto the electronic document 108 for one hour, one day, one week, or any other time period after being created.

In an embodiment, the virtual sticky 110 and its corresponding summary data may be stored at a location associated with the electronic document 108. For instance, if the electronic document 108 is stored locally within the computing device 102, then the virtual sticky 110 may be stored locally within a file that is associated with the electronic document 108 such that when the electronic document 108 is loaded and displayed within the content viewer 104, the virtual sticky 110 is displayed as well. Storage of the virtual sticky 110 may also include display preferences, including, but not limited to, size, shape, color, transparency, position of the overlay, and persistence information. In another embodiment, the virtual sticky 110 may be stored within metadata of the electronic document 108 such that when the content viewer 104 loads and displays the electronic document 108, the content viewer 104 reads the metadata related to the virtual sticky 110 and displays the virtual sticky 110 based on the metadata within the electronic document 108. In other embodiments where the electronic document 108 is stored remotely, data representing the virtual sticky 110 may also be stored remotely and associated with the electronic document 108.

The graphical appearance of the virtual sticky 110 may be configurable. Graphical appearance of the virtual sticky 110 may include, but is not limited to, size, shape, color, and transparency. In an embodiment, the size of virtual sticky 110 may be adjustable. For instance, the user may make the virtual sticky 110 larger or smaller. The font size for the summary data display 340 may also adjust corresponding to changes in the size of the virtual sticky 110. Additionally, configuration of the virtual sticky 110 may include a minimum font size for the summary data display 340, such that if the size of the virtual sticky 110 is set to a size smaller than the minimum font size, then the virtual sticky 110 may only display a portion of the summary data display 340. The remaining portion of the summary data display 340 may be visible using an enabled scroll bar on the virtual sticky 110.

In an embodiment, the shape of the virtual sticky 110 display may be modified. For example, the height or width of the virtual sticky 110 display window may be increased or decreased. Additionally, the overall shape of the virtual sticky 110 display window may be adjusted stylistically. For example, the user may configure the virtual sticky 110 to have rounded edges, an oval shape, or any other configured shape.

The color of the virtual sticky 110 may be adjustable. For instance, the user may adjust either the background color of the virtual sticky 110 or the font color of the summary data display 340. In an embodiment, the virtual sticky 110 may be configured to automatically generate in a color that is stylistically compatible to the electronic document 108. For example, if the electronic document 108 has a white background color, then the generation of the virtual sticky 110 may be configured to automatically generate the virtual sticky 110 with a dark background such as dark blue or green. In contrast, if the electronic document 108 has a dark background, such as dark grey or black, then the generation of the virtual sticky 110 may be configured to automatically generate the virtual sticky 110 with a lighter background such as yellow or white.

In an embodiment, the transparency level of the virtual sticky 110 may be configurable. For instance, the user may adjust how transparent the virtual sticky 110 is when overlaid onto the electronic document 108. The more transparent the virtual sticky 110 is the more the user may be able to view the portion of the electronic document 108 that is obstructed by the virtual sticky 110.

4.2. Virtual Sticky Summary Data

In an embodiment, summary data display 340 represents the summary data generated at step 210 in FIG. 2. The summary data display 340 represents a summary of the identified data items 305 from the electronic document 108. FIG. 5 depicts a sample embodiment of the virtual sticky 110 and the summary data display 340 displayed within the graphical display 106. The summary data display 340 may include a summarized data table 510 of summary information and a summary title 505. The summary title 505 may be a configurable title given to the summary data in order to convey the type of summary information that is displayed within the virtual sticky 110. The summarized data table 510 represents the summary data displayed within the virtual sticky 110. In an embodiment, the summarized data table 510 display may represent the complete set of data items 305 summarized at step 210 or a configured subset of data items 305 summarized. For example, if the data summarized at step 205 includes the purchase amount for each account number, then the each summary data item may include the account number and the sum value of amount purchased for each account. The virtual sticky 110 may then display the account number and the amount purchased within the summarized data table 510. Alternatively, the user may configure the virtual sticky 110 to display only the account numbers. The user may do this for sanity checking purposes in order to determine whether the correct accounts are identified within the electronic document 108. In this scenario, the summarized data table 510 may then display the account number only.

In an embodiment, the virtual sticky 110 may be configured to display additional information that is associated with the data items 305 within the electronic document 108. For instance, the summarized data table 510 may be configured to display external information related to the accounts summarized. FIG. 5 depicts an example of the summarized data table 510 displaying external account description information. In this example, the "Account Name" column may represent information retrieved from an external server. The content viewer 104 or an associated module may be configured to retrieve information associated with the data items 305 for the purposes of conveying relevant and easily recognizable information to the user. For instance, if the account information is stored in an external account management database, then the content viewer 104 may be configured to query and retrieve the account names using the account numbers.

In an embodiment, the format of the summary data displayed in the summarized data table 510 may be customizable. Formatting may include, but is not limited to, changing the order of the column attributes, changing the order of the data items in the rows, and changing the orientation of the summarized data table 510. For example, if the user wanted to change the orientation of the summarized data table 510, the user may use the virtual sticky control panel 420 to change the row and column orientation from the orientation depicted in FIG. 5 to the following:

| Acct # | 6400 | 7340 | TOTAL |
|---|---|---|---|
| Account Name | FOOD ITEMS | DISPOSABLE | |
| Amount | $91.86 | $137.87 | $229.73 |

In an embodiment, the virtual sticky 110 may be configured with controls to export data items 305, summary data, or both to an external server. For example, if the electronic document 108 contained data items 305 associated with record keeping in an external record keeping database, then the virtual sticky 110 may be equipped with functionality to export the data items to the record keeping database. FIG. 5 depicts an embodiment of an export button 315 configured to export data items 305 associated with the summary data displayed in the virtual sticky 110. The export button 520 may be configured to export the data items 305 to a specific target destination. For example, if the user clicked on the export button 520 shown in FIG. 5, then the virtual sticky 110 would export to an external server the data items 305 summarized in the summarized data table 510. In this case, the data items 305 would include data item numbers 1, 2, and 8 from table 325 from FIG. 2 for account number 6400 and data item numbers 3-7 from table 325 from FIG. 2 for account number 7340. Additionally, the export button 520 may be configured to send the data items 305 associated with the summary data in the summarized data table 510 and the summary data itself. In an embodiment, the user may configure the export button 520 to export the data items 305 and summary data itself to multiple specific destinations such that the data items 305 are export to one target destination and the summary data is exported to another target destination.

5. Implementation Examples

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
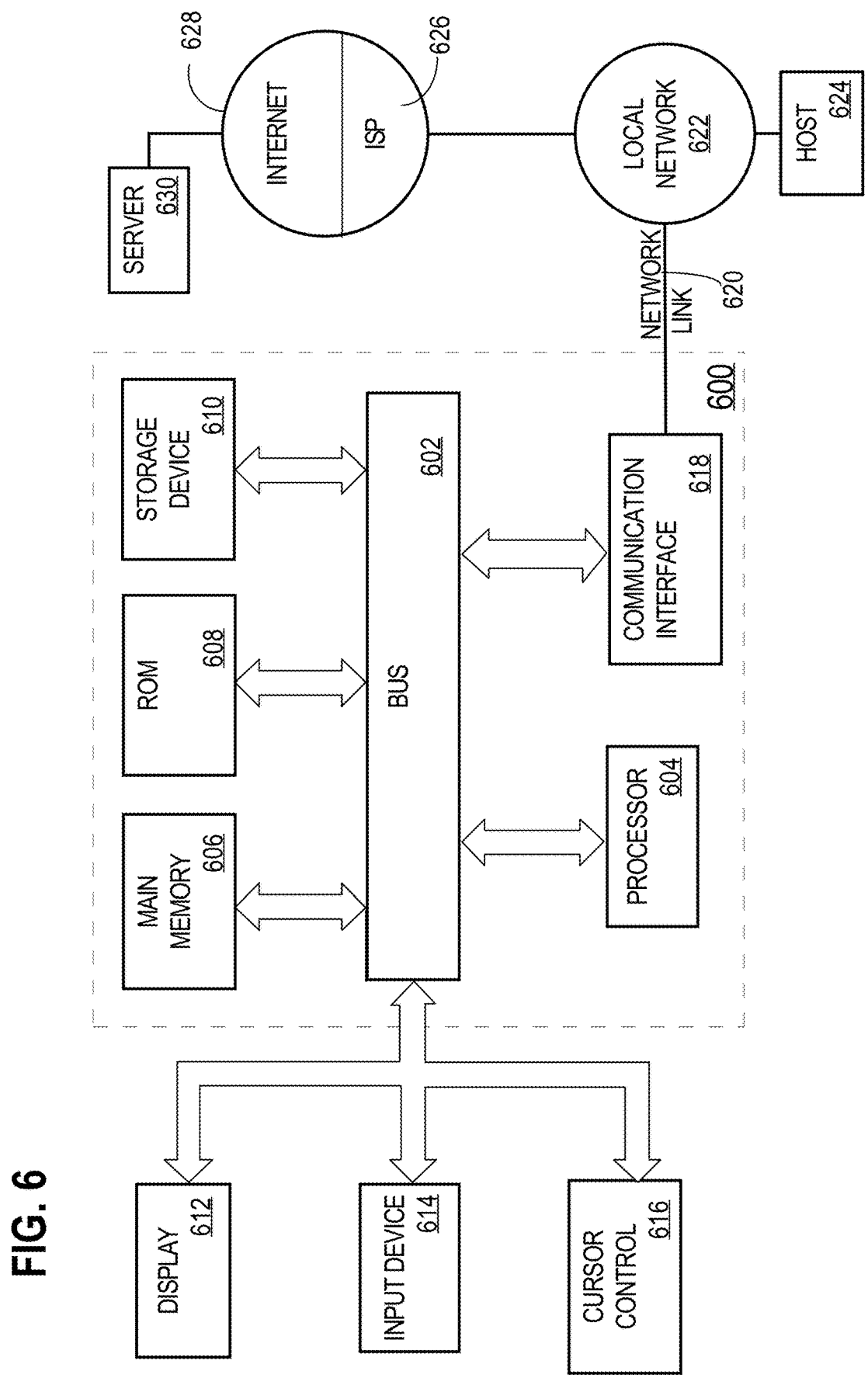
FIG. 6 is a block diagram that depicts an example computer system upon which embodiments may be implemented.

FIG. 6 is a block diagram that depicts an example computer system 600 upon which embodiments may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. Although bus 602 is illustrated as a single bus, bus 602 may comprise one or more buses. For example, bus 602 may include without limitation a control bus by which processor 604 controls other devices within computer system 600, an address bus by which processor 604 specifies memory locations of instructions for execution, or any other type of bus for transferring data or signals between components of computer system 600.

An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic or computer software which, in combination with the computer system, causes or programs computer system 600 to be a special-purpose machine. According to one embodiment, those techniques are performed by computer system 600 in response to processor 604 processing instructions stored in main memory 606. Such instructions may be read into main memory 606 from another non-transitory computer-readable medium, such as storage device 610. Processing of the instructions contained in main memory 606 by processor 604 causes performance of the functionality described herein. In alternative embodiments, hard-wired circuitry may be used in place of or in combination with software instructions to implement the embodiments. Thus, embodiments are not limited to any specific combination of hardware circuitry and software.

The term "non-transitory computer-readable medium" as used herein refers to any non-transitory medium that participates in providing data that causes a computer to operate in a specific manner. In an embodiment implemented using computer system 600, various computer-readable media are involved, for example, in providing instructions to processor 604 for execution. Such media may take many forms, including but not limited to, non-volatile and volatile non-transitory media. Non-volatile non-transitory media includes, for example, optical or magnetic disks, such as storage device 610. Volatile non-transitory media includes dynamic memory, such as main memory 606. Common forms of non-transitory computer-readable media include, without limitation, a floppy disk, a flexible disk, hard disk, magnetic tape, or any other magnetic medium, a CD-ROM, any other optical medium, a RAM, a PROM, and EPROM, a FLASH-EPROM, any other memory chip, memory cartridge or memory stick, or any other medium from which a computer can read.

Various forms of non-transitory computer-readable media may be involved in storing instructions for processing by processor 604. For example, the instructions may initially be stored on a storage medium of a remote computer and transmitted to computer system 600 via one or more communications links. Bus 602 carries the data to main memory 606, from which processor 604 retrieves and processes the instructions. The instructions received by main memory 606 may optionally be stored on storage device 610 either before or after processing by processor 604.

Computer system 600 also includes a communication interface 618 coupled to bus 602. Communication interface 618 provides a communications coupling to a network link 620 that is connected to a local network 622. For example, communication interface 618 may be a modem to provide a data communication connection to a telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be processed by processor 604 as it is received, and/or stored in storage device 610, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors; and
   one or more memories storing instructions which, when processed by one or more processors, cause:
   displaying an electronic document on a graphical user interface of the apparatus, wherein the electronic document includes a plurality of data items;
   generating, based upon the plurality of data items included in the electronic document, summary data that includes two or more summary data items and summarizes at least two or more data items from the plurality of data items included in the electronic document;
   displaying a virtual sticky on the graphical user interface of the apparatus, wherein the virtual sticky displays the summary data, and
   wherein a format of the summary data is customizable by user input.

2. The apparatus of claim 1, wherein:
   the summary data includes a summary data table, and the summary data table represents a complete set or a configured subset of the summarized at least two or more data items from the plurality of data items included in the electronic document.

3. The apparatus of claim 1, wherein:
   the summary data include a summary data table, and
   the format of the summary data includes one or more of an order of column attributes of the summary data table, an orientation of the summary data table, a row orientation of the summary data table, or a column orientation of the summary data table.

4. The apparatus of claim 1, wherein:
   processing of the instructions by the one or more processors further causes displaying a virtual sticky control panel on the graphical user interface of the apparatus, and
   the format of the summary data is customizable by user input via the virtual sticky control panel.

5. The apparatus of claim 1, wherein:
   a portion of the summary data is visible, and
   a remaining portion is visible via a scroll bar on the virtual sticky.

6. The apparatus of claim 1, wherein the format of the summary data includes a font size of the summary data.

7. The apparatus of claim 1, wherein one or more of size, color, transparency, shape, or position of the virtual sticky are selected via a virtual sticky control panel.

8. The apparatus of claim 1, wherein the virtual sticky has a color that is stylistically compatible to the electronic document.

9. One or more non-transitory computer-readable media storing instructions which, when processed by one or more processors, causes:
   displaying an electronic document on a graphical user interface of an apparatus, wherein the electronic document includes a plurality of data items;
   generating, based upon the plurality of data items included in the electronic document, summary data that includes two or more summary data items and summarizes at least two or more data items from the plurality of data items included in the electronic document;
   displaying a virtual sticky on the graphical user interface of the apparatus, wherein the virtual sticky displays the summary data, and
   wherein a format of the summary data is customizable by user input.

10. The one or more non-transitory computer-readable media of claim 9, wherein: the summary data includes a summary data table, and the summary data table represents a complete set or a configured subset of the summarized at least two or more data items from the plurality of data items included in the electronic document.

11. The one or more non-transitory computer-readable media of claim 9, wherein:
   the summary data include a summary data table, and
   the format of the summary data includes one or more of an order of column attributes of the summary data table, an orientation of the summary data table, a row orientation of the summary data table, or a column orientation of the summary data table.

12. The one or more non-transitory computer-readable media of claim 9, wherein:
   processing of the instructions by the one or more processors further causes displaying a virtual sticky control panel on the graphical user interface of the apparatus, and
   the format of the summary data is customizable by user input via the virtual sticky control panel.

13. The one or more non-transitory computer-readable media of claim 9, wherein:
   a portion of the summary data is visible, and
   a remaining portion is visible via a scroll bar on the virtual sticky.

14. The one or more non-transitory computer-readable media of claim 9, wherein the format of the summary data includes a font size of the summary data.

15. The one or more non-transitory computer-readable media of claim 9, wherein one or more of size, color, transparency, shape, or position of the virtual sticky are selected via a virtual sticky control panel.

16. The one or more non-transitory computer-readable media of claim 9, wherein the virtual sticky has a color that is stylistically compatible to the electronic document.

17. A computer-implemented method comprising:
   displaying an electronic document on a graphical user interface of an apparatus, wherein the electronic document includes a plurality of data items;
   generating, based upon the plurality of data items included in the electronic document, summary data that includes two or more summary data items and summarizes at least two or more data items from the plurality of data items included in the electronic document;
   displaying a virtual sticky on the graphical user interface of the apparatus, wherein the virtual sticky displays the summary data, and
   wherein a format of the summary data is customizable by user input.

18. The computer-implemented method of claim 17, wherein: the summary data includes a summary data table, and the summary data table represents a complete set or a configured subset of the summarized at least two or more data items from the plurality of data items included in the electronic document.

19. The computer-implemented method of claim 17, wherein:
   the summary data include a summary data table, and
   the format of the summary data includes one or more of an order of column attributes of the summary data table, an orientation of the summary data table, a row orientation of the summary data table, or a column orientation of the summary data table.

20. The computer-implemented method of claim 17, wherein:
   processing of the instructions by the one or more processors further causes displaying a virtual sticky control panel on the graphical user interface of the apparatus, and
   the format of the summary data is customizable by user input via the virtual sticky control panel.

* * * * *